(12) United States Patent
Simonds

(10) Patent No.: X7978
(45) Date of Patent: Jan. 23, 1834

(54) SCYTHES, MANUFACTURING

(76) Inventor: Abel Simonds

Abel Simonds of

Letters Patent

The schedule referred to in these Letters Patent, and making part of the same, containing a description in the words of the said Abel Simonds himself of his improvement in the Art of making scythes –

A the side of the lower face B. the end of the lower face. C the concave surface of the lower face. D. the side of gauge for back – E the upper surface of gauge – F. the perpendicular side of the face above the gauge. G. the side of the upper face H the end of the upper face I. the convex surface of the upper face The above drawings represent the instruments used in fashioning the web of what is called the concave set scythe, The instruments represented in the above drawings are called faces and are employed in fashioning the scythe by fixing the lower or concave face in an anvil stock, and the upper or convex face in a trip hammer The use of these faces in the trip hammer forms what is called the concave set scythes "

The patent is claimed for the invention of those parts of the above described faces only, that are employed in fashioning the web of the scythe, making it concave, convex The above is the specification of the claim for the invention of making the concave set scythes –

Witnesses
Artemas Rogers
John T. Farwell

Abel Simonds –

260 ([illegible])

[illegible]

Drawing